(12) United States Patent
Bowers et al.

(10) Patent No.: US 10,168,673 B2
(45) Date of Patent: Jan. 1, 2019

(54) ANALYTIC-BASED ENERGY CONSUMPTION CONTROL

(71) Applicant: International Business Machines Corporation, Armonk, NY (US)

(72) Inventors: John A. Bowers, Austin, TX (US); Andrew Laforteza, Austin, TX (US); Ryan D. McNair, Austin, TX (US); Alvaro Sanchez-Cifuentes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/057,775

(22) Filed: Mar. 1, 2016

(65) Prior Publication Data

US 2017/0256941 A1 Sep. 7, 2017

(51) Int. Cl.
G05B 13/04 (2006.01)
G05B 11/14 (2006.01)
H02J 3/14 (2006.01)
H02J 13/00 (2006.01)
H02J 3/00 (2006.01)

(52) U.S. Cl.
CPC ............ G05B 13/041 (2013.01); G05B 11/14 (2013.01); H02J 3/14 (2013.01); H02J 13/0006 (2013.01); H02J 2003/007 (2013.01); H02J 2003/143 (2013.01); Y02B 70/3225 (2013.01); Y04S 20/222 (2013.01)

(58) Field of Classification Search
CPC ......... G05B 11/06; G05B 11/14; G05B 11/16; G05B 11/18; G05B 17/00
See application file for complete search history.

(56) References Cited

U.S. PATENT DOCUMENTS

| 8,818,532 | B1 | 8/2014 | Vasquez |
| 8,996,188 | B2 | 3/2015 | Frader-Thompson et al. |
| 2012/0306661 | A1 | 12/2012 | Xue et al. |
| 2013/0278066 | A1 | 10/2013 | Lovisotto |
| 2013/0307702 | A1 | 11/2013 | Pal et al. |

(Continued)

FOREIGN PATENT DOCUMENTS

CN 202076623 12/2011

OTHER PUBLICATIONS

"Bye Bye Standby BBSBUSA Energy Saving Kit with 1 Remote and 2 Sockets", http://www.amazon.com/Bye-Standby-BBSBUSA-Energy-Sockets/dp/B0010383XM, know about as early as Aug. 2015.

(Continued)

Primary Examiner — Cheung Lee
(74) Attorney, Agent, or Firm — Kunzler, PC

(57) ABSTRACT

For analytic-based control of energy consumption, an appliance module receives an appliance identifier of an appliance connected to a power outlet, a selection module selects a power model for the power outlet based on the appliance identifier, the power model designating times that the power outlet is to be powered and times that the power outlet is to be unpowered, a usage module receives energy usage data for a power outlet, a presence module receives user presence data for a locale containing the power outlet, a update module modifies a power model for the power outlet based on the energy usage data and the user presence data, and a power control module selectively provides electrical power to the power outlet according to the power schedule.

20 Claims, 6 Drawing Sheets

(56) References Cited

U.S. PATENT DOCUMENTS

| | | |
|---|---|---|
| 2014/0088780 A1 | 3/2014 | Chen |
| 2014/0098247 A1 | 4/2014 | Rao et al. |
| 2014/0180490 A1 | 6/2014 | Mozayeny |
| 2014/0184406 A1 | 7/2014 | Trundle et al. |
| 2014/0191573 A1 | 7/2014 | Chen et al. |
| 2014/0265566 A1 | 9/2014 | Nguyen et al. |
| 2014/0325245 A1 | 10/2014 | Santini et al. |
| 2015/0066227 A1 | 3/2015 | Chapel et al. |
| 2015/0094828 A1 | 4/2015 | Bhargava et al. |
| 2015/0185261 A1 | 7/2015 | Frader-Thompson et al. |

OTHER PUBLICATIONS

J. Byun et al., "Design and Implementation of an Intelligent Energy Saving System based on Standby Power Reduction for a Future Zero-Energy Home Environement", IEEE Transactions on Consumer Electronics, vol. 59, No. 3, Aug. 2013, pp. 507-514.

Adam Dachis, "GreenZero Wall Travel Charger Stops Sucking Power When Your Device's Battery Is Full", http://lifehacker.com/5991568/greenzero-wall-travel-charger-stops-sucking-power-when-your-devices-battery-is-full, Mar. 20, 2013.

Josh Chan, Leaving Idle Appliances Plugged in Drives up Power Bills; Which Devices are Worst Offenders?, http://archive.peninsulapress.com/2011/03/30/leaving-idle-appliances-plugged-in-drives-up-power-bills-which-devices-are-worst-offenders/, Peninsula Press, Mar. 30, 2011.

"Smart Strip 4940 LCG3 LCG3M Energy Saving Surge Protector with Autoswitching Technology, 10-Outlet", http://www.amazon.com/Smart-Strip-Protector-Autoswitching-Technology/dp/B0006PUDQK, know about as early as Aug. 2015.

N. Morimoto et al., "Smart Outlet Network for Energy-Aware Services Utilizing Various Sensor Information", 2013 27th International Conference on Advanced Information Networking and Applications Workshops (WAINA), Mar. 2013, pp. 1630-1635.

Tanuja Ganu et al., "SocketWatch: saving energy by the appliance", IBM Research, http://ibmresearchnews.blogspot.in/2013/12/socketwatch-saving-energy-by-appliance.html#fbid=i9khThE4ZZI, Feb. 2, 2013.

ANALYTIC-BASED ENERGY CONSUMPTION CONTROL

FIELD

The subject matter disclosed herein relates to energy control and more particularly relates to analytic-based energy consumption control.

BACKGROUND

Over the past few decades, the number of electronic devices in households, offices, and other structural environments. These electronic devices are massive consumers of electricity—not only while they are being actively used, but even while they are in standby or turned off. This waste energy is known as "vampire energy" and is estimated to account for 10% of all residential energy use.

BRIEF SUMMARY

A method for analytic-based control of energy consumption is disclosed. An apparatus and computer program product also perform the functions of the method. The method includes receiving an appliance identifier for an appliance connected to a power outlet, selecting a power model for the power outlet based on the appliance identifier, the power model designating times that the power outlet is to be powered and times that the power outlet is to be unpowered, receiving energy usage data for the power outlet, receiving user presence data for a locale containing the power outlet, modifying the power model for the power outlet based on the energy usage data and the user presence data, and selectively providing electrical power to the power outlet according to the power model.

The apparatus for analytic-based control of energy consumption includes an appliance module that receives an appliance identifier of an appliance connected to a power outlet, a selection module that selects a power model for the power outlet based on the appliance identifier, the power model designating times that the power outlet is to be powered and times that the power outlet is to be unpowered, a usage module that receives energy usage data for a power outlet, a presence module that receives user presence data for a locale containing the power outlet, a update module that modifies a power model for the power outlet based on the energy usage data and the user presence data, and a power control module that selectively provides electrical power to the power outlet according to the power schedule, wherein at least a portion of the usage module, presence module, schedule module, and power control module comprise one or more of hardware and executable code, the executable code stored on one or more computer readable storage media.

The computer program product for analytic-based control of energy consumption includes a computer readable storage medium having program instructions embodied therewith, the program instructions readable/executable by a processor to cause the processor to: receive, by processor, an appliance type parameter for an appliance connected to a power outlet, select, by processor, a power model for the power outlet based on the appliance type parameter, the power model designating times that the power outlet is to be powered and times that the power outlet is to be unpowered, track, by processor, energy usage data for the power outlet, track, by processor, user presence data for a locale containing the power outlet, modify, by processor, the power model for the power outlet based on the energy usage data and the user presence data, and selectively provide, by processor, electrical power to the power outlet according to the power model.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
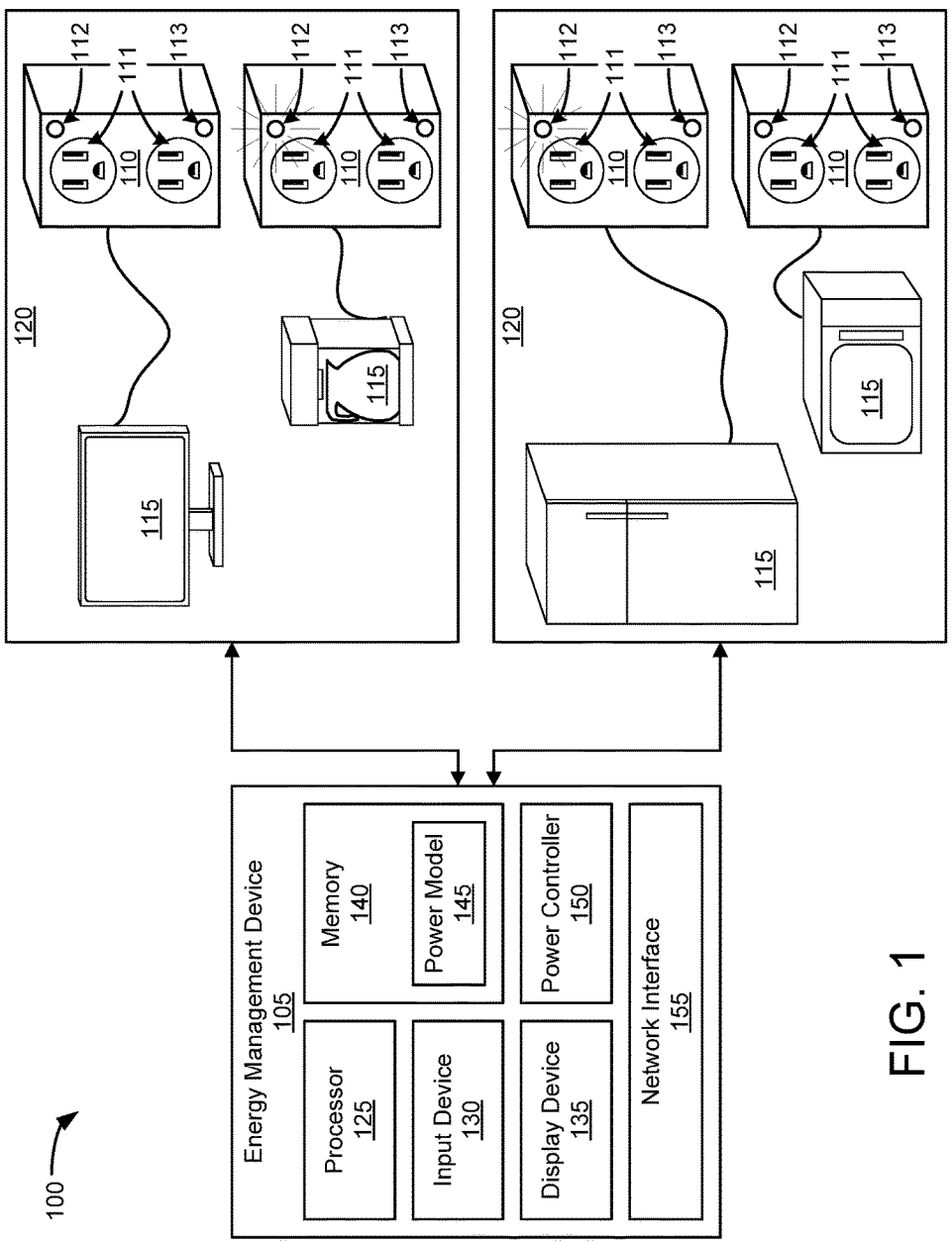
FIG. 1 is a schematic block diagram illustrating one embodiment of a system for analytic-based control of energy consumption in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers, and network software that have been tested to work with the computer program product. Those operating systems, version numbers, and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

The disclosed embodiments use analytics such as end-user proximity and usage patterns to control energy consumption through power outlets. Although the standby energy of an individual device may be small, the annual total of this wasted energy (vampire energy) becomes massive. A key factor of the cumulative total being the average device spends most of its time not in use (but still consuming low amounts of energy). While small-scale solutions, such as unplugging a device not in use, may reduce a residence's, or office's, energy use, it is not always feasible to unplug each and every device in the residence when not in use. For example, microwaves, stoves, refrigerators, and other appliances may be plugged outlets behind the appliance, or in other hard-to-reach places. Further, it quickly becomes tedious to unplug every device on a regular basis, when not in use.

When considering the trend toward smart devices with the Internet of things, and the trend towards the smart homes and buildings, a more holistic solution may be employed to control energy usage. The disclosed embodiments control the supply of electricity to individual outlets based on analytics of the current state of the end-user, when the user tends to use these devices (usage patterns), and information about the end devices plugged in each outlet this allows for an automated way to drastically reduce vampire energy in a smart-home/smart-building. However, the disclosed embodiments are not limited to the smart-home/smart-building environment. Rather, the disclosed systems, apparatuses, methods, and computer program products may be used in any locale to control energy consumption.

An example appliance usable with the disclosed embodiments may be a microwave oven. A device such as a microwave oven waste a lot of energy while standby: it has an electronic display that unnecessarily consumes power while the microwave oven is not being used. Additionally, electrical converters within the microwave oven (e.g., power transformers, AC-to-DC power converters, etc.) constantly consume power while the microwave oven is not being used (e.g., for cooking). This leads to a vampire energy consumption at the microwave oven. Further, a microwave oven tends to be used at certain times of the day, while the rest of the day it is completely unused.

By analyzing behavior patterns of the appliances and/or power outlets (e.g., power usage patterns at the microwave oven), along with statistics constantly generated by the smart/home or building (e.g., whether someone is present, asleep, etc.) the disclosed embodiments identify the most likely time of use of a particular appliance and/or power outlet. To generate and/or modify a power model for the power outlet such that the power outlet is energized at times of likely use, while the rest the time it is powered off, thereby significantly reducing vampire energy consumption.

In some embodiments, an initial power model may be selected for selectively providing electrical power to an appliance so as to provide immediate power savings. Thereafter, the disclosed systems, apparatuses, and the like gather data about power consumption of different power outlets (e.g., throughout a house or office). For appliances that consume different amounts of electricity when they are actively used versus one on standby, the gather data may be compared to a power threshold to easily identify when each appliance is in active use and when it is standby mode.

The gathered data is then used to refine the initially selected power model. The power model predicts "typical" usage patterns for the different power outlets based on features such as: time of day, day of week, number (and/or type) of devices connected to a WLAN, which other outlets are used, and the like. The initial power model may be selected based on an identifier provided by an appliance or by the user manually classifying an appliance type of an appliance plugged into an outlet. Using the refined power model, a monitoring system automatically turns on and off power to individual power outlets, thereby saving energy by eliminating the wasted "vampire energy" a devices in standby mode.

In certain embodiments, an easy manual override exists to turn an outlet back on. This may include the user flipping a switch, pressing a button, entering a command via computer interface, and the like. Cases where the user has to manually override the disclosed systems, apparatuses, etc. are registered as important misses for the learning algorithm. Also, smart devices which are plugged in may talk to the smart-buildings monitoring system and identify themselves, not only by whatever device they are (e.g., clock radio), but also notify the system whether or not they can withstand a power shut off or not. Those appliances that cannot withstand a power shut off may be exempted from the disclosed analytic-based control of energy consumption, while those appliances capable of withstanding a power shut off are selectively provided power throughout the day. Similarly, devices that require constant electricity throughout the day may be exempted from the disclosed analytic-based control of energy consumption.

For example, assume that to clock radio appliances are present at a locale, where one clock radio appliance is a "smart" clock radio that receives a signal allowing it to reset and set itself (e.g., reset its time and other settings) and the other clock radio appliance is a "less smart" clock radio appliance that cannot set the time on its own. Here, the smart clock identifies itself as being able to withstand a power interruption, this way the disclosed embodiments may turn off the smart clock radio while all users are way from the locale, thus saving electricity, while the "less smart" clock radio would not get turned off, thus not affecting the end-user experience.

FIG. 1 depicts a system 100 for analytic-based control of energy consumption, according to embodiments of the present disclosure. The system 100 may include an energy management device 105 communicatively coupled to a plurality of power outlets 110. One or more appliances 115 may be connected to (e.g., plugged into) the plurality of power outlets 110, so as to receive a lexical power via a power outlet 110. In some embodiments, the system 100 services one or more locales 120, each locale 120 including at least one power outlet 110.

The energy management device 105, in one embodiment, is a computer device configured to control energy delivery to one or more power outlets 110 to which it is connected via a communication network. Examples of computing devices include, but are not limited to, computer servers, mainframes, desktop computers, laptop computers, tablet computers, smartphones, microcomputers, embedded systems, integrated circuits, application-specific integrated circuits ("ASICs"). The energy management device 105 may include a processor 125, an input device 130, an output device 135, a memory 140, a power controller 150, and a network interface 155. In some embodiments, the energy management device 105 is located physically remote from the one or more locales 120 and is connected to the locales 120 using one or more network connections. In other embodiments, the energy management device 120 may be located within one locale 120 of the one or more locales 120. For example, the energy management device 120 may be co-located with one of the power outlets 110 of the plurality of power outlets 110. As another example, the energy management device 120 may be located at a grid connection connecting the power outlets 110 (and the locales 120) to an electrical distribution grid.

The processor 125, in one embodiment, may comprise any known controller capable of executing computer-readable instructions and/or capable of performing logical operations. For example, the processor 125 may be a microcontroller, a microprocessor, a central processing unit (CPU), a graphics processing unit (GPU), an auxiliary processing unit, a FPGA, or similar programmable controller. In certain embodiments, the processor 125 may include a plurality of processing units, such as a plurality processing cores, a plurality of CPUs, a plurality of microcontrollers, or the like. In some embodiments, the processor 125 executes instructions stored in the memory 140 to perform the methods and routines described herein. The processor 125 is communicatively coupled to the input device 130, the display device 135, the memory 140, the power controller 150, and the network interface 155.

The input device 130, in one embodiment, may comprise any known computer input device including a touch panel, a button, a keyboard, and the like. The input device 130 is configured to receive input from a user, for example touch input, key press input, and the like. In certain embodiments, the input device 130 may include a microphone or other suitable device for receiving voice input from the user. For example, the user may speak one or more commands, wherein input device 130 receives the one or more commands as voice input. In one embodiment, the input device 130 comprises a microphone for receiving input and/or instructions via voice. In another embodiment, the input device 130 comprises an input/output ("I/O") interface for receiving a computer readable file containing input and/or instructions (e.g., a data packet or an instruction file).

In one embodiment, the input device 130 includes a touch-sensitive portion, such as a touch-sensitive input panel, configured to receive touch input from the user, such as an input gesture. In some embodiments, at least the touch-sensitive portion of the input device 120 may be integrated with the display device 135, for instance as a touchscreen or similar touch-sensitive display.

The display device 135, in one embodiment, may comprise any known electronic display capable of outputting visual data to a user. For example, the display device 135 may be an LCD display, an LED display, an OLED display, a projector, or similar display device capable of outputting images, text, characters, and the like to a user. The display device 135 may displays a user interface, such as a graphical user interface (GUI). In one embodiment, the user interface may include one or more windows. The user interface allows a user to interact with the energy management device 105. For example, the display device 135 may present a user interface containing one or more menus, buttons, charts, graphs, input fields, and the like, wherein the user may input instructions and/or data via the user interface using the input device 130.

In some embodiments, the display device 135 may be integrated with at least a portion of the input device 130. For example, the display device 135 and a touch panel of the input device 130 may be combined to form a touchscreen or similar touch-sensitive display. The display device 135 may receive data for display from the processor 125, the memory 140, and/or the power controller 150.

The memory 140, in one embodiment, is a computer readable storage medium. In some embodiments, the memory 140 includes volatile computer storage media. For example, the memory 140 may include a random access memory (RAM), including dynamic RAM (DRAM), synchronous dynamic RAM (SDRAM), and/or static RAM (SRAM). In some embodiments, the memory 140 includes non-volatile computer storage media. For example, the memory 140 may include a hard disk drive, a flash memory, or any other suitable non-volatile computer storage device. In some embodiments, the memory 140 includes both volatile and non-volatile computer storage media.

In some embodiments, the memory 140 stores additional data relating to analytic-based energy consumption control. For example, the memory 140 may store energy management data including, but not limited to, power usage history and user presence history. As used herein, power usage history refers to a collection of data relating to power usage at various times over a window of time (e.g., past day, past week, past month, past year, etc.). The power usage history may relate to a specific power outlet 110, to a specific locale 120, to a specific appliance 115, to a specific user, or the like. As used herein, user presence history refers to a collection of data relating to the physical presence of one or more user at a specific locale 120 at various times over a window of time.

In another example, the memory 140 may store data for identifying the appliances 115 (e.g., appliance identifiers, models, and the like), tracking appliance usage (e.g., which appliances 115 are used/plugged-in and at what times), and/or where the appliances 115 are located (e.g., a power outlet 110 and/or locale associated with an appliance 115). In some embodiments, the memory 140 also stores program code and related data, such as an operating system or other controller algorithms operating on the energy management device 105.

The memory 140 may include one or more power models 145. As used herein, a power model 145 designates specific times that a power outlet 110 is to be powered and times that the power outlet is to be unpowered. In one embodiment, the power model 145 may include time frames during which electrical power is to be provided to the power outlet 110. In another embodiment, the power model 145 may comprise transition times, indicating points of time when the electrical power to the power outlet 110 is to be switched on or off.

Each power model 145 may be specific to a type or class of appliance 115. Examples of different appliance types for which the memory 140 may store a power model 145 include, but are not limited to, a refrigerator, a microwave, a television, a coffee maker, and the like. In some embodiments, various types of appliances 115 may have similar (or identical) power models 145. For example, a power model 145 for a microwave may resemble (or be identical to) a power model 145 for a coffee maker, as both types of appliances may be used at similar times during the day. Alternatively, each power model 145 may be specific to a type of locale 120 containing the power outlet(s) 110. For example, the power model 145 may be specific to a home, a workspace, a business, a break room, a kitchen, a bedroom, a living area, a bathroom, and the like.

The power controller 150, in one embodiment, is configured to selectively provide electrical power to a power outlet 110 according to a power model 145, as described in further detail below. The power controller 150 identifies an appliance 115 connected to a power outlet 110 and to select a power model 145 for the power outlet 110 based on the appliance identity (the power model 145 designated times that the power outlet 110 is to be powered and times that the power outlet 110 is to be unpowered). The power controller 150 further receives energy usage data for the power outlet 110, receives user presence data for a locale 120 containing the power outlet 110, and modifies the power model 145 for the power outlet 110 based on energy usage data and on the user presence data. The power controller 150 then selectively provides electrical power to the power outlet 110 according to the modified power model 145. In some embodiments, the power controller 150 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

In one embodiment, the energy management device 105 and/or the power controller 150 generate the power models 145. For example, the power controller 150 may gather and analyze power consumption data in order to generate the power models 145. In another embodiment, the energy management device 105 may receive the power models 145, for example, from a remote database, from a server, from another energy management device 105, or the like. In some embodiments, the memory 140 may store a power model 145 for each appliance 115 and/or locale 120 to which the energy management device 105 is communicatively coupled. In further embodiments, the memory 140 may store one or more power models 145 for an appliance 115 or locale 120 to which the energy management device 105 is not communicatively coupled. For example, the memory 140 may store a power model 145 for a dishwasher previously coupled to the energy management device 105 even if no dishwasher is currently coupled to the energy management device 105.

The network interface 155, in one embodiment, facilitates communication between the energy management device 105 and the power outlets 110. In certain embodiments, the network interface 155 allows the energy management device 105 to communicate with a remote database, a server, and/or another energy management device 105. For example, the network interface 115 may allow the energy management device 105 to transmit and/or receive one or more power models 145 relating to one or more appliances 115 located in the one or more locales 120 and connected to the one or more power outlets 110.

The power outlets 110, in one embodiment, provide electrical power to one or more appliances 115 coupled to the power outlets 110. While FIG. 1 depicts a power outlet 110 as containing two power sockets 111 (each socket configured to receive a power plug from an appliance 115), the present description is not to be limited to power outlets 110 consisting of two power sockets 111. Indeed, one of ordinary skill in the art will appreciate that a power outlet 110 may include any number of power sockets 111. For example, a power outlet 110 may contain only one power socket 111. In another example, a power outlet 110 may contain three or more power sockets 111. Further, two or more power outlets 110 may be physically adjacent to each other in a particular locale 120, thereby clustering a plurality of power sockets 111 from two or more power outlets 110 in the same region of the locale 120.

Each power outlet 110 is controllable by the energy management device 105 to selectively provide electrical power to a connected appliance 115. Accordingly, each power outlet 110 is energized at certain times, thereby being capable of providing electrical power to a connected appliance 115 during those times. Further, each power outlet 110 is disconnected at other times, thereby being incapable of providing electrical power to a connected appliance 115 during those times. As used herein, a connected appliance 105 refers to an appliance 115 whose power plug is inserted into a power socket 111 of a power outlet 110 (e.g., an appliance 115 plugged into that power outlet 110).

In some embodiments, a power outlet 110 may include an indicator 112 that indicates whether or not the power outlet 110 is energized (e.g., capable providing electric power to a connected appliance 115). In some embodiments, the indicator 112 may be an LED, or similar light-emitting component, which produces light when the power outlet 110 is energized. In certain embodiments, a power outlet 110 may include a manual override switch 113 that allows a user to manually override the current power state of the power outlet 110. As depicted, the manual override switch 113 may be a button located at an outer surface of the power outlet 110.

Each power outlet 110 has a network connection to the energy management device 105. In some embodiments, a power outlet 110 may establish a new wireless network connection with the energy management device 105. In other embodiments, a power outlet 110 may establish a wired network connection with the energy management device 105. For example, an Ethernet connection may be used to connect the power outlet 110 to the energy management device 105. As another example, a power outlet 110 may communicate with the energy management device 105 using power-line communications.

As used herein, a power state of the power outlet 110 refers to whether the power outlet 110 is energized or not. Thus, an energized power outlet 110 is in an energized power state, while a disconnected power outlet 110 is in a deactivated power state. By pressing the manual override switch 113, a user may manually switch a power outlet 110 from a deactivated power state to an energized power state, or vice versa.

The appliances 115, in one embodiment, are devices located in the locales 120 and connectable to a power outlet 110. Each appliance 115 consumes electrical power (e.g., via the power outlet 110). In certain embodiments, an appliance 115 consumes the power even when not being actively used by a user. For example, an appliance 115 in standby mode may monitor for certain triggers and wake up from the standby mode (e.g., enter an active mode) in response to a trigger. As another example, an appliance 115 may maintain its circuitry in an energized state, thereby consuming a small amount of power (e.g., vampire energy/power) even when not being actively used by a user.

In some embodiments, an appliance 115 may be a smart device capable of communicating with other devices. A smart device may determine and communicate status or other information. Accordingly, a smart device consumes power even when not being actively used by a user. For example, an appliance 115 may be a smart washing machine capable of communicating with another device (e.g., a smart phone, a tablet computer, laptop computer, or other computing device) even when not being used to wash clothes. The smart washing machine may provide status updates to the another device and/or may receive instructions from the another device.

As another example, an appliance 115 may be a Wi-Fi enabled refrigerator capable of communicating with another device even when the cooling system (e.g., fan, compressor, etc.) is off, a water pump is off, and a light is off. The Wi-Fi enabled refrigerator may collect temperature data, components status (e.g., water filter) data, and the like while the core refrigerator functions (e.g., cooling, interior lighting, etc.) are off. Further, the Wi-Fi enabled refrigerator may provide status/data to the another device and/or may receive instructions from the another device while the core refrigerator functions are off.

FIG. 1 depicts specific examples of appliances 115, and further depicts a specific number of appliances 115; however, the present description is not to be limited to the example shown in FIG. 1. For example, although FIG. 1 depicts a television, a coffee maker, a refrigerator, and a microwave oven, other embodiments may include additional types of appliances 115 present in the one or more locales 120. Further, although FIG. 1 depicts for appliances 115, other embodiments may include any number of appliances 115 present in the one or more locales 120.

The locales 120, in one embodiment, are physical locations containing the power outlets 110. In some embodiments, a locale 120 may be a room within a residence (or alternatively within an office space) or a portion thereof, wherein each room of the residence (or office space) is represented by a separate locale 120. Examples of residential space locales 120 include, but are not limited to, a bedroom, a bathroom, a kitchen, a laundry area, a living space, and the like. Examples of office space locales 120 include, but are not limited to, a workspace, a breakroom, a kitchenette, a reception area, and the like.

In another embodiment, an open (e.g., wall-less) office space may have a section dedicated for workstations and another section dedicated for a break area. Here, each section may be a locale 120. As depicted, one or more locales 120 may be connected to the energy management device 105 via the power outlets 110, wherein energy management device 105 controls energy consumption within the one or more locales 120 by selectively providing electrical power to the power outlets 110.

Each locale 120 may be occupied and/or used by a user at certain times and unoccupied and/or unused at other times. For example, a user may be present in a kitchen/kitchenette and may use the appliances 115 located therein at mealtimes, but the kitchen/kitchenette may be unoccupied and/or unused at other times of the day. As another example, the user may be present in a bedroom area (and use appliances 115 located therein) at evening, night, and early morning, but the bedroom area may be unoccupied and/or unused at other times of the day.

As used herein, user presence data refers to the particular times when a particular locale 120 is in use by a user. User presence data is primarily determined based on power usage of the appliances 115 located in each locale 120. In some embodiments, user presence data may also be based on motion detection at the locale 120, calendar/schedule data of a user, and the like. As described in the disclosed embodiments, user presence data may be used to determine at which times the power outlets 115 in a particular locale 120 are to be energized.

The system 100 includes the ability to determine what type of appliances 115 plugged into a power outlet 110. Based on the appliance type of a particular appliance 115, the energy management device 105 may select among a plurality of pre-trained power models 1454 common appliance types. This allows for immediate energy consumption savings by using the pre-trained models, rather than requiring a training before selecting/applying a power model. The pre-trained power models 145 are then personalized to each power outlet 110 and/or locale 120 using analytic-based learning techniques.

An example of analytic-based control of energy consumption, using the system 100, includes identifying that an appliance type for a particular appliance 115 is a television and that the locale 120 in which to the television appliance 115 is located is a residence (for example, a bedroom or residential living space). As television appliances 115 tend to be used during non-work hours, a pre-trained power model 145 may be selected based on the appliance type (e.g., television) and, optionally, locale 120 (e.g., residential) such that a power outlet 110 to which the television appliance 115 is connected would be "unplugged" (e.g., deactivated) by default during working hours. Accordingly, immediate energy consumption savings occur by using the pre-trained power model 145. Further, the power model 1454 the television appliance 115 may be further customized based on specific energy usage patterns/history and user presence patterns/history for the locale 120.

Figure 2:
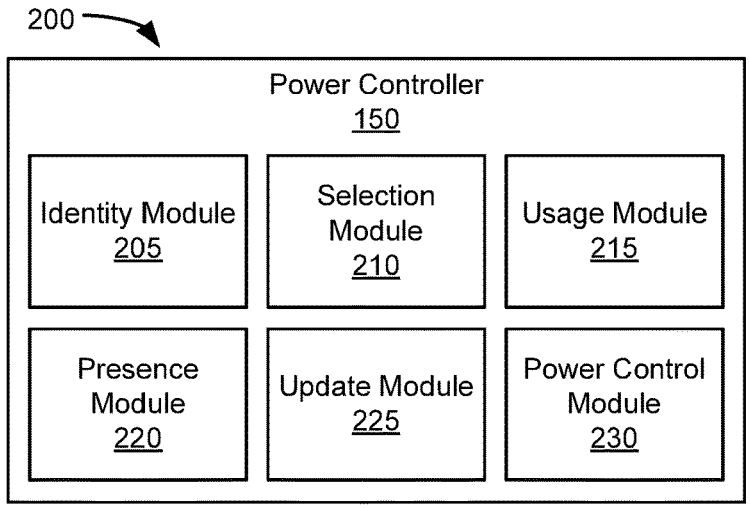
FIG. 2 is a schematic block diagram illustrating one embodiment of an apparatus for analytic-based control of energy consumption in accordance with one embodiment of the present invention.

FIG. 2 depicts an apparatus 200 for analytic-based control of energy consumption, according to embodiments of the present disclosure. The apparatus 200 may be used to selectively provide electrical power to a power outlet 110 according to a power model 145. The apparatus 200 may include one embodiment of a power controller 150. As depicted, the power controller 150 may include an identity module 205, a selection module 210, a usage module 215, a presence module 220, an update module 225, and a control module 230.

The identity module 205, in one embodiment, receives an appliance identifier for an appliance 115 connected to a power outlet 110. As used herein, an appliance identifier refers to information usable to identify one or more of: an appliance type of the appliance 115, a model of the appliance 115, a serial number of the appliance 115, and a brand of the appliance 115. In some embodiments, the identity module 205 may determine characteristics of the appliance 115 using the appliance identifier. For example, in one embodiment the identity module 205 may determine an appliance type of the appliance 115 is in the appliance identifier (e.g., using the model number or serial number of the appliance 115). As another example, the identity module 205 may identify operating characteristics, power consumption characteristics, data collection characteristics, data communication characteristics, and the like for the appliance 115 using the appliance identifier.

In one embodiment, the identity module 205 receives the appliance identifier via user input. For example, a user may enter the appliance identifier via the input device 130. In a further example, a user may access the energy management device 105 and/or the power outlet 110 via a web browser and input the appliance identifier using the web browser. In another embodiment, the identity module 205 receives the appliance identifier from the appliance 115. For example, a smart appliance 115 may connect wirelessly with the power outlet 110 and/or the energy management device 105 (e.g., via a wireless interface) and transfer an appliance identifier for the smart appliance 115 via a wireless data packet. In another example, a smart appliance 115 may transmit its appliance identifier to the power light 110 using a power-line communication protocol.

In a further embodiment, the identity module 205 may monitor wireless communications with the locale 120 in order to intercept wireless transmissions from the appliance 115. The identity module 205 may identify the appliance 115 using the intercepted wireless transmission, for example identifying the appliance 115 using a MAC address or other network identifier. In certain embodiments, the identity module 205 may further initiate communication with the appliance 15 using the intercepted network identifier (e.g., MAC address) using a local wireless communication protocol (e.g., WLAN, Bluetooth, etc.) In order to query the appliance 115 for its appliance type, model number, serial number, brand, or other appliance characteristic useful for selecting a power model 145.

In some embodiments, the identity module 205 may identify the appliance 115 by monitoring power usage of the appliance 115 for a predetermined amount of time (e.g., sufficient to collect a threshold number of data points) and then comparing the monitored power usage to one or more power usage profiles to find a best fitting power usage profile. For example, a non-smart appliance 115 may be unable to provide an appliance identifier and thus the identity module 205 may identify the non-smart appliance 115 by its power usage profile. In certain embodiments, each power usage profile may be associated with an appliance type.

The selection module 210, in one embodiment, selects a power model 145 for use by the power outlet 110 based on the appliance identifier. In some embodiments, the power model 145 designates times that the power outlet is to be powered and times that the power outlet is to be unpowered. The selection module 210 may receive the appliance identifier from the identity module 205. In one embodiment, identity module 205 may write the appliance identifier to specific location in the memory 140, wherein the selection module 210 retrieves the appliance identifier from the specific memory location. In another embodiment, the identity module 205 may communicate the appliance identifier directly to the selection module 210.

In certain embodiments, the selection module 210 determines an appliance type for the appliance 115 based on the appliance identifier and further selects the power model 145 based on the appliance type. Where the appliance identifier (as received from the identity module 205) does not include the appliance type, then the selection module 210 may determine the appliance type based on the received identifier. For example, the identity module 205 may communicate an appliance model/serial number to the selection module 210, wherein the selection module 210 may determine an appliance type for the appliance 115 based on the received appliance model/serial number.

In some embodiments, the selection module 210 may power model 145 based on the locale 120 in which the appliance 115 is located. For example, a microwave appliance 115 located in an office space may be used at different times of day then an identical microwave appliance 115 located in a residential space. Accordingly, the selection module 210 may select a power model 145 appropriate for the locale 120 in which the appliance 115 is located (e.g., business/office versus residential).

In some embodiment, different appliances 115 may be plugged into the same power outlet 110 at various times. In one embodiment, the selection module 210 may select a new power model 145 each time an appliance 115 is plugged into the power outlet 110. In another embodiment, the selection module 210 may select a single power model 145 that best fits the usage of the power outlet 110 (e.g., by referring to a power usage profile).

The usage module 215, in one embodiment, receives energy usage data for a power outlet 110. In some embodiments, the usage module 215 tracks the energy usage data by storing the received data to a storage device, such as the memory 140. As used herein, energy usage data refers to data describing amounts and at times of power use by a power outlet 110. Energy usage data may be tracked for each power outlet 110 communicatively coupled to the energy management device 105 (and thus the power controller 150). In certain embodiments, the usage module 215 correlates the energy usage data with an appliance identifier for an appliance 115 plugged into the power outlet 110.

The presence module 220, in one embodiment, receives user presence data for a locale 120 containing the power outlet 110. Presence data may be used to determine when a user is likely to use a power outlet 110 within the locale 120. For example, if a user is present in a particular locale 120 (e.g., in a kitchen/kitchenette) at a regular time of day, then it is more likely that the user will use a particular power outlet 110 located within the particular locale 120. Accordingly, future use of the power outlet 110 may be anticipated using the presence data.

In some embodiments, the presence module 220 tracks the energy usage data by storing the received data to a storage device, such as the memory 140. In certain embodiments, user presence may be indicated by use of a power outlet 110 located within the locale 120. For example, user presence in the locale 120 may be indicated when any power outlet 110 located within the locale 120 is in use. In other embodiments, the user presence may be indicated by motion detection data, by tracking a transponder (e.g., RFID tag) belonging to the user, or by monitoring lighting usage within the locale 120 (e.g., user presence is indicated whenever an overhead light is switched on). In still other embodiments, user presence may be indicated by monitoring for wireless signals from a portable electronic device, such as a smart phone, tablet computer, a wearable electronic device (e.g., fitness tracker, Bluetooth headset, or smart watch), or the like.

In some embodiments, the presence module 220 receives locale information for the locale 120, wherein the selection module 210 selects the power module based on the locale information. For example, the locale and information may indicate whether the locale 120 is a residential space or a business/commercial space. The locale information may further indicate a time zone of the locale 120, wherein the power model 145 is implemented based on the time zone (e.g., times indicated in the power module 145 may be referenced according to the identified time zone). In certain embodiments, the locale information may be received from user. For example, a user may input the locale information a web browser or other user interface. In other embodiments, the locale information may be derived from user activity, for intercepting wireless communications, from GPS or other coordinate data, and the like.

The update module 225, in one embodiment, modifies the power model 145 for the power outlet 110 based on the energy usage data and the user presence data. As used herein, modifying the power model 145 refers to changing the times that the power outlet 110 is to be powered and the times that the power outlet 110 is to be unpowered based on the energy usage data and the user presence data. The update module 225 analyzes both the energy usage data and the user presence data in order to customize the power module 145. For example, after gathering a statistically significant number of energy usage data points and user presence data points, the update module 225 may customize the power model 145 to fit the specific historical usage of the power outlet 110 (e.g., based on the energy usage data) and likely future usage of the power outlet 110 (e.g., based on the user presence data). The update module 225 may modify the power module 145 on a periodic basis and/or in response to a specific trigger (e.g., in response to a user request received via the input device 130).

In certain embodiments, the originally selected power model 145 may designate times the power outlet 110 is to be powered/unpowered in large increments of time. For example, the originally selected power model 145 may designate powered/unpowered times in increments of 30 minutes or more. In such embodiments, the update module 225 may modify the originally selected power model 145 to use smaller increments of time. For example, the update module 225 may use the energy usage data and the user presence data to designate powered/unpowered times in increments of 15 minutes or less.

In some embodiments, the update module 225 may modify the power model 145 to reflect changed patterns of energy usage and/or user presence. For example, an electric heater appliance 115 may be used more or less depending on the season, wherein the update module 225 may modify the power model 145 to reflect the changing seasons. As another example, a new appliance 115 may be initially used on a frequent basis, but may be used less frequently as the novelty wears off, wherein update module 225 may modify the power model 145 to reflect the less frequent use.

The power control module 230, in one embodiment, selectively provides electrical power to the power outlet 110 according to the power model 145. The power control module 230 may selectively provide electric power to the power outlet 110 according to an originally selected power model 145. As the power model 145 is customized by the update module 225, the power control module 230 may selectively provide electrical power to the power outlet 110 according to the modified power model 145.

As used herein, selectively providing electric power to the power outlet 150 refers to the power control module 230 either providing electrical power to the power 110 or withholding electrical power from the power outlet 110. In one embodiment, the power control module 230 selectively provides electrical power to each power socket 111 of the power outlet 110 independently of other power sockets 110 of the same power outlet 110. In another embodiment, the power control module 230 may control the power outlet 110 such that all power sockets 111 are energized (or unpowered) at the same time.

In some embodiments, the power control module 230 controls whether the power outlet 110 is connected to, or disconnected from, an electrical power source (e.g., a power grid). In one embodiment, the power control module 230 may control a relay or other electrical switch connecting the power sockets 111 of the power outlet 110 to the electrical power source. In another embodiment, the power control module 230 may provide instructions to the power outlet 110 whether to power (or unpowered) the power sockets 111.

Figure 3:
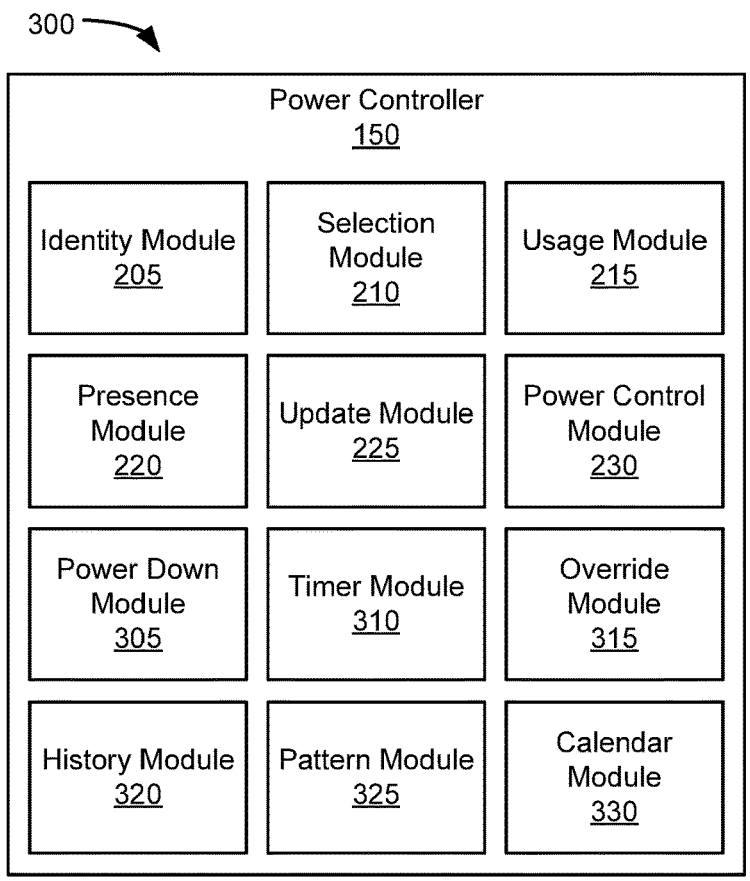
FIG. 3 is a schematic block diagram illustrating another embodiment of an apparatus for analytic-based control of energy consumption in accordance with one embodiment of the present invention.

FIG. 3 depicts an apparatus 300 for analytic-based control of energy consumption, according to embodiments of the present disclosure. The apparatus 300 may be used to selectively provide electrical power to a power outlet 110 according to a power model 145. The apparatus 300 may include one embodiment of a power controller 150. As depicted, the power controller 150 may include an identity module 205, a model selection module 210, a usage module 215, a presence module 220, an update module 225, and a control module 230. The module 205-230 may be substantially similar to those described above with reference to FIG. 2. The power controller 150 may also include one or more of: a power down module 305, a timer module 310, an override module 315, a history module 320, a pattern module 325, and a calendar module 330.

The power down module 305, in one embodiment, receives a power down command from the appliance 115. For example, a smart appliance 115 may identify a future period of disuse and send a power down command to the energy management device 105 and/or the power controller 150. In some embodiments, the appliance 115 may transmit the power down command to the power down module 305 using a wireless interface, for example a WLAN connection, a Bluetooth connection, and the like. In certain embodiments, the appliance 115 may transmit the power down command to the power down module 305 via the power outlet 110. For example, the power outlet 110 may include a wireless transceiver, wherein the appliance 115 communicates the power down command via the power outlet 110. As another example, the power outlet 110 may receive the power down command from the appliance 115 via a power-line communication protocol (e.g., using the electrical power connection between the appliance 115 and the power outlet 110 as a communication medium), wherein the power outlet 110 may relay the power down command to the power down module 305.

As used herein, a power-down command refers to an instruction to temporarily depower the power outlet 110. In certain embodiments, the power down command may override the power model 145. In response to receiving a power down command, the power down module 305 may signal the power control module 230 to de-power/deactivate the power outlet 110. Accordingly, the power control module 230 may withhold electrical power from the power outlet 110 in response to the power down module 305 receiving the power down command.

In certain embodiments, power down module 305 may also signal the update module 225 in response to receiving the power down command. In certain embodiments, the update module 225 modifies the power model 145 for a power outlet 110 associated with the power down command based on the power down module 305 receiving a power down command. For example, if a power-down command is received at a particular time of day for at least a significant number of times (e.g., three days or more), then the power model 145 may be updated to depower the power outlet 110 at the particular time of day.

The timer module 310, in one embodiment, initiates a timer in response to the power down command. For example, the power down module 305 may signal the timer module 310 upon receipt of the power-down command, wherein the timer module 310 initiates the timer in response to the signal. In certain embodiments, the power down command includes a time parameter, wherein timer counts an amount of time (e.g., 60 minutes) indicated in a time parameter of the power down command. Upon expiration of the timer, the timer module 310 may signal the power control module 230 to again provide power to the power outlet 110 according to the power model 145. In one example, the power control module 230 may again provide power to the power outlet 110 after expiration of the timer, due to the power model 145 indicating that the power outlet 110 should be energized. In another example, the power control module 230 may keep the power outlet 110 unpowered after expiration of the timer, due to the power model 145 indicating that the power outlet 110 should be unpowered.

The manual override module 315, in one embodiment, receives a manual override command from the power outlet 110. For example, a user may press the manual override switch 113, wherein the power outlet 110 generates a manual override command communicates the same to the manual override module 315. As used herein, a manual override command refers to an instruction to override the power model 145 at the power outlet 110. In certain embodiments, the manual override command is a user input command, for example where the user presses the manual override switch 113. In other embodiments, a user may use a web browser or other application to send a manual override command via the network interface 155.

The manual override module 315 may signal the power control module 230 and/or the update module 225 in response to receiving the manual override command. If the power outlet 110 is unpowered when the manual override command is received, then the manual override module 315 signals the power control module 230 to energize (e.g., provide electrical power to) the power outlet 110. Otherwise, if the power outlet 110 is powered when the manual override command is received, then the manual override module 315 signals the power control module 230 to disconnect (e.g., withhold electrical power from) the power outlet 110. Further, the update module 225 may modify the power model based on the manual override command. For example, if a manual override command is received at a particular time of day for at least a significant number of times (e.g., three days or more), then the power model 145 may be updated at the particular time of day.

In some embodiments, the manual override module 315 signals the power control module 230 overrides the power model 145 for a predetermined amount of time in response to the manual override command. For example, the power control module 230 may override the power model 145 for a user defined amount of time (such as 30 minutes) in response to the manual override command. The power control module 230 reverts to selectively providing electrical power based on the power model 145 after the predetermined amount of time expires. In one embodiment, the timer module 310 may count down the predetermined amount of time using a timer and signal the power control module 230 to revert to using the power model 145 upon expiration of the timer.

In certain embodiments, such as where the manual override command results in the power control module energizing the power outlet 110, the power control module 230 may continue to override the power model 145 (e.g., continue to energize the power outlet 110) until energy usage at the power outlet 110 drops below a threshold amount for threshold period of time (e.g., no more than "vampire energy" usage for 10 minutes). The power control module 230 reverts to selectively providing electrical power based on the power model 145 after the energy usage drops below a threshold amount for threshold period of time.

The history module 320, in one embodiment, stores the energy usage data as power usage history and stores the user presence data as presence history, wherein the update module 225 modifies the power model based on the power usage history and the presence history. In further embodiments, the history module 320 may store appliance history data that tracks when a particular appliance is plugged in and/or used. The appliance history may be useful for locales 120 containing a limited number of power outlets 110, such that a user must unplug one appliance 115 in order to use another appliance 115. By tracking the appliance history, the update module 225 may update the power model 145 for a particular power outlet 110 such that it combines power models for the individual appliances that are plugged into the particular power outlet 110.

In some embodiments, the history module 320 tracks power usage history and/or presence history for limited amount of time. For example, the history module 320 may track power usage history and/or presence history for up to one year, wherein the history module 320 discards energy usage data and/or user presence data older than one year. By tracking only recent history, the history module 320 is able to respond to current trends. In certain embodiments, the history module 320 associates a time of year with the power usage history and/or her presence history. For example, certain appliances 115 may receive greater use during certain seasons of the year. Accordingly, the history module 320 may identify seasonal use of the appliance 115 and the update module 225 may modify the power model 145 based on a current season.

The pattern module 325, in one embodiment, generates a power usage pattern for an appliance 115 based on the power usage history. In some embodiments, the pattern module 325 may identify one or more periods of low power usage from the power usage history and one or more periods of high power usage from the power usage history. The pattern module 325 may determine whether the periods of low power use and/or whether the periods of high power use are statistically significant. Based on the statistically significant periods of low/high power use, the pattern module 325 may generate a power usage pattern for the appliance 115. The pattern module 325 may further communicate the generated power usage pattern to the update module 225, wherein the update module 255 may customize the power model 145 based on the power usage pattern.

The calendar module 330, in one embodiment, identifies calendar events indicating a scheduled disruption in the use of the locales 120 controlled by the power controller 150. In some embodiments, the calendar module 330 predicts whether disruption of the power usage and/or user presence in the locales 120 is likely based on the calendar events. The calendar module 330 may communicate the calendar events and/or predictions to the update module 225, wherein the update module 225 may temporarily modify the power model 145 based on the calendar events and/or predictions. The calendar events are used to determine days and/or times where the power model 145 is inapplicable. Examples of calendar events include, but are not limited to, holidays, vacation times, appointments away from the locales 120, and other events that differ from the regular pattern of power usage and user presence in the locales 120.

In some embodiments, the counter module 330 may be configured to receive calendar data from the user. For example, the calendar module 330 may query a user's computing device, such as a smart phone, tablet computer, laptop, desktop computer, or other calendar device. As another example, the calendar module 330 may receive calendar events input by a user via a user interface, such as a web browser or other application. Based on the calendar events, the calendar module 330 may determine whether an event or activity is scheduled which would cause a deviation from the regular pattern of power usage and user presence in the locales 120. For example, if the locales 120 represent office space, a calendar event may indicate certain days when the office is closed (e.g., for a state/federal holiday, where the staff is gone for vacation, where the office is closed for cleaning). Where multiple users may be present in the locales 120, the calendar module 330 may consider the multiple users in predicting whether a disruption of the regular pattern of power usage and user presence is likely. The update module 225 may temporarily modify the power model 145 for the duration of the predicted disruption.

Figure 4:
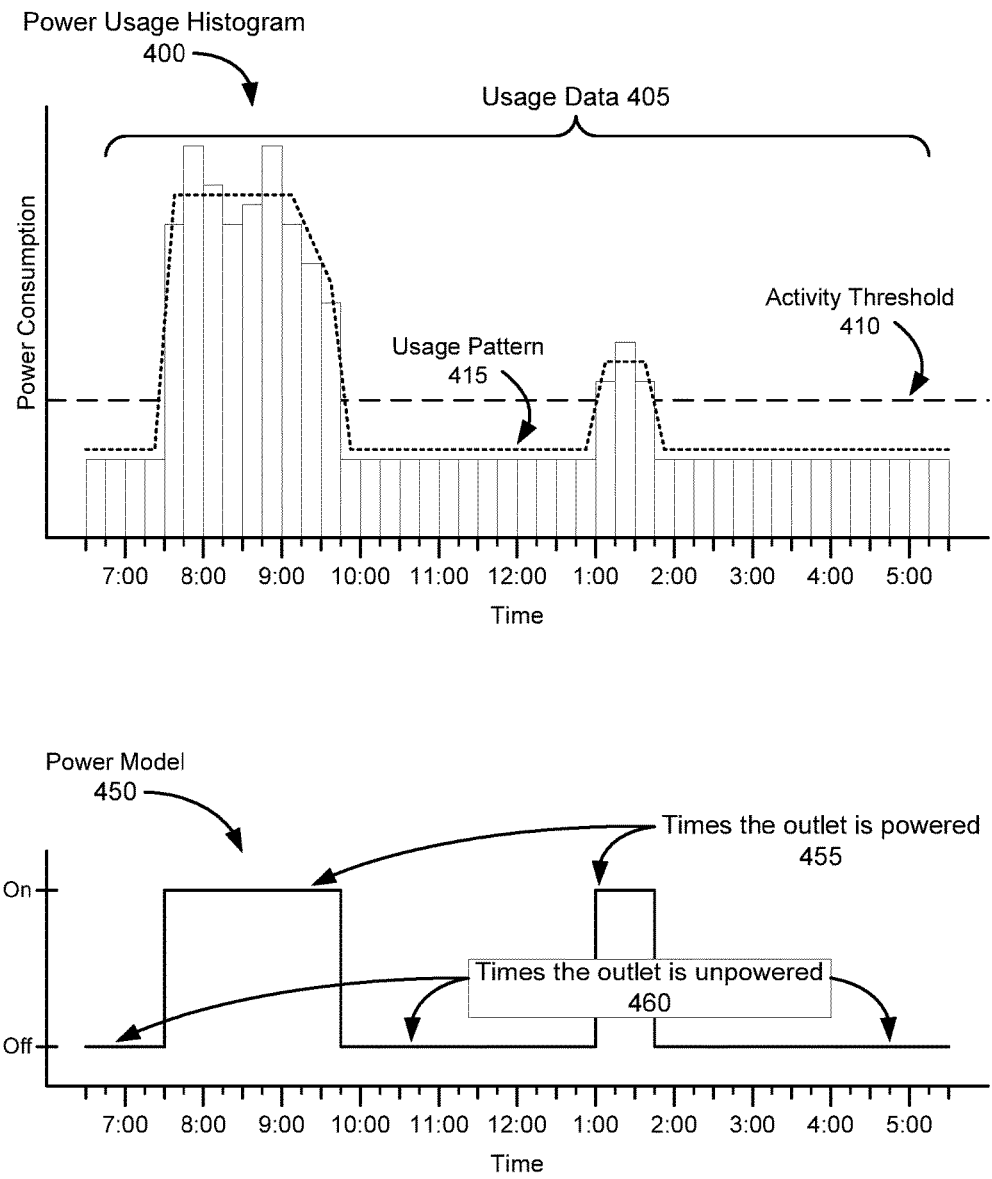
FIG. 4 is a schematic diagram illustrating another embodiment of a system for analytic-based control of energy consumption in accordance with one embodiment of the present invention.

FIG. 4 depicts a power usage histogram 400 and a power model 450 for analytic-based control of energy consumption, according to embodiments of the present disclosure. The power usage histogram 400 may be one embodiment of power usage history tracked by the history module 320. The power usage histogram 400 is created using collected energy usage data for a power outlet 110.

The power usage histogram 400 includes usage data 405 for a plurality of times during the day. The usage data 405, in one embodiment, is collected over a period of several days (e.g., 90 days), to ensure that the usage data 405 is statistically significant. The usage data 405 may represent collective power usage during increments of time. Here, the usage data 405 is for increments of 15 minutes, however other increments may be used according to the disclosed embodiments.

As depicted, the usage data 405 indicates little to no power consumption (e.g., activity) at the power outlet 110 until approximately 7:30 AM. Note that the power consumption before 7:30 AM is nonzero, for example due to vampire energy consumption of the appliance 115 plugged into the power outlet 110. At approximately 7:30 AM, power consumption increases beyond an activity threshold 410. The activity threshold 410 is used to distinguish vampire energy consumption from user activity. As depicted, the usage data 405 indicates that power consumption stays above the activity threshold 410 until approximately 9:45 AM.

The power usage histogram 400 further depicts a second period of user activity from approximately 1:00 PM to 1:45 PM, where the power consumption is above the activity threshold 410. From the usage data 405, the pattern module 325 may generate a usage pattern 415 modeling a predicted amount of power usage based on the accumulated usage data 405. As depicted, the usage pattern 145 indicates two time periods of predicted power consumption above the activity threshold 410.

The power usage histogram 400 and/or the usage pattern 415 may be used to generate the power model 450. In some embodiments, the power model 450 is a modified version of a previous power model (e.g., a power model 145 selected based on an appliance type). The power model 450 is customized for the particular usage pattern 415 of the power outlet 110. As depicted, the power model 450 includes times 455 when the power outlet 110 is powered (e.g., energized). These times 455 include a first period 7:30 AM to 9:45 AM and a second period from 1:00 PM to 1:45 PM. The power model 450 also includes times 460 when the power outlet 110 is unpowered (e.g., deactivated). These times 460 include a first period lasting until 7:45 AM, a second period from 9:45 AM to 1:00 PM, and a third period beginning at 1:45 PM. In certain embodiments, the first period and the third period are a single period beginning at 1:45 PM on one day and ending at 7:45 AM the next day.

In one embodiment, the power model 450 may be described using only the times 455 that the power outlet 110 is to be powered. Here, a default power state of the power outlet 110 is a deactivated state, wherein the times 455 indicate a deviation from the default power state (e.g., indicate when the power outlet 110 is to be in an energized state). In another embodiment, the power model for 50 may be described using only the times 460 that the power outlet 110 is to be unpowered. Here, the default power state is an energized state, wherein the times 460 indicate a deviation from the default power state.

In a further embodiment, the power model 450 may be described using an initial power state and the transition times depicted in FIG. 4. As used herein, a transition time refers to a time when the power state transitions from a deactivated state to an energized state, or vice versa. Here, the initial power state is a deactivated state and there are four transition times at 7:30 AM, 9:45 AM, 1:00 PM, and 1:45 PM. The power control module 230 may receive the power model 450 in any of the forms described above, and selectively control the power outlet 110 based on the times 455 that the power outlet 110 is to be powered, the times 460 that the power outlet 110 is to be unpowered, and/or the initial power state and transition times.

Figure 5:
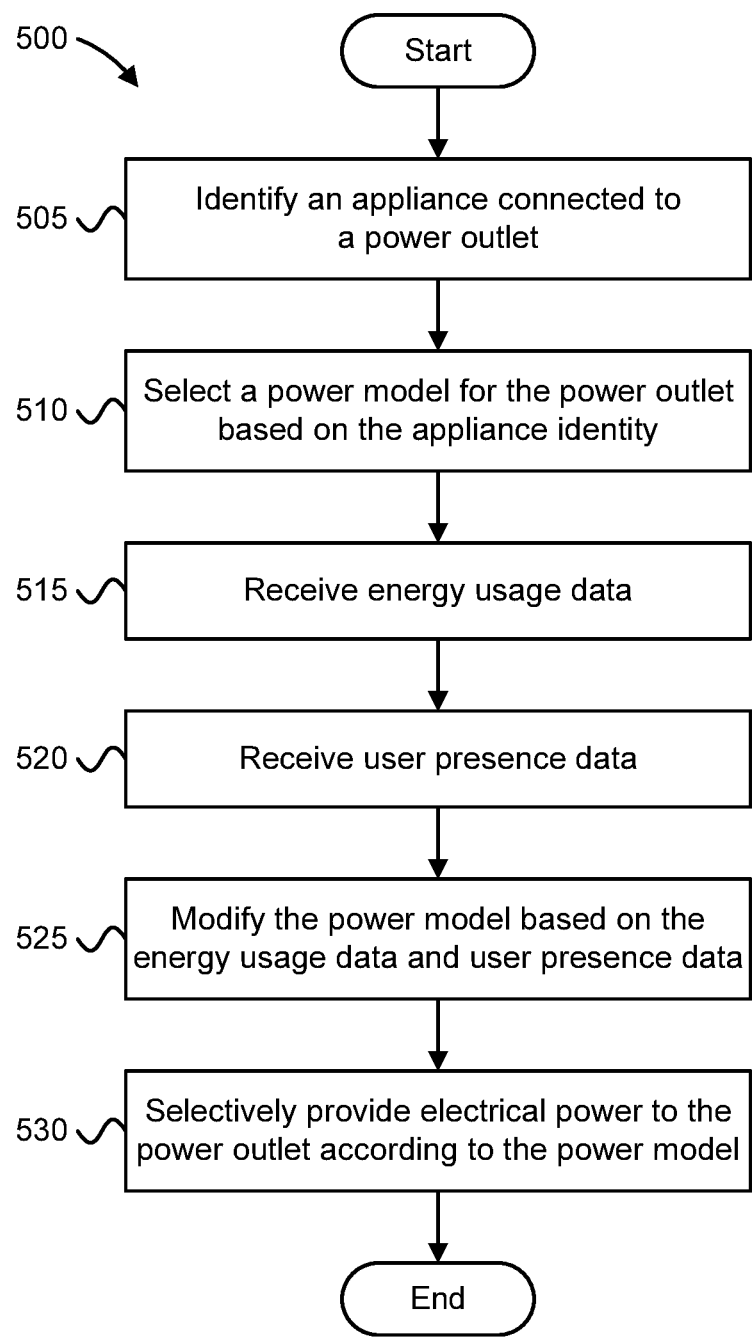
FIG. 5 is a schematic flowchart diagram illustrating one embodiment of a method for analytic-based control of energy consumption in accordance with one embodiment of the present invention.

FIG. 5 depicts a method 500 for analytic-based control of energy consumption, according to embodiments of the present disclosure. The method 500 controls energy consumption at a power outlet 110 by selectively providing electrical power to the power outlet 110 based on a power model. In some embodiments, the method 500 may be performed by the energy management device 105. In addition, the method 500 may be performed by a processor (e.g., the processor 125) and/or other semiconductor hardware embodied in the energy management device 105. In another example, the method 500 may be embodied as computer program code stored on computer readable storage media.

The method 500 begins and identifies 505 an appliance connected to a power outlet. In one embodiment, the x205 identifies 505 an appliance 115 connected to a power outlet 110. In some embodiments, identifying 505 the appliance 115 connected to a power outlet 110 includes receiving an appliance identifier from the appliance 115. In one embodiment, the appliance 115 may send a data packet containing the appliance identifier to the outlet 110 (e.g., via wireless or power-line communications). In another embodiment, a "smart" appliance 115 may transmit wireless data packets (e.g., to a wireless access point), wherein the energy management device 105 intercepts or "sniffs" the wireless data packet to detect and identify the appliance 115.

In certain embodiments, identifying 505 the appliance 115 connected to a power outlet 110 includes determining an appliance type based on the appliance identifier. For example, the appliance identifier may be an appliance model number, a serial number, or the like, wherein the x205 determines an appliance type based on the appliance model number, serial number, etc. As another example, the appliance identifier itself may comprise an appliance type for the appliance 115.

The method 500, selects 510 a power model for the power outlet based on the appliance identifier. In one embodiment, the x210 selects 510 the power model 145 for the power outlet 110 based on the appliance identifier. In certain embodiments, the power model 145 designates times that the power outlet 110 is to be powered and times that the power outlet 110 is to be unpowered. Selecting 510 the power model 145 may include accessing a database or lookup table ("LUT") and retrieving a power model 145 based on the appliance identity. In certain embodiments, selecting 510 the power model 145 may include selecting the power model 145 based on an appliance type of the appliance 115 connected to the power outlet 110, the appliance type being included in or derived from the appliance identifier.

The method 500 receives 515 energy usage data for the power outlet. In one embodiment, the usage module 215 receives 515 energy usage data for the power outlet 110. In certain embodiments, the energy usage data indicates a level of power consumption at the power outlet 110 over a particular interval of time. In some embodiments, receiving 515 the energy usage data may include the history module 320 storing the energy usage data as usage history.

The method 500 receives 520 user presence data for a locale containing the power outlet. In one embodiment, the presence module 220 receives 520 user presence data for a locale 120 containing the power outlet 110. In certain embodiment, the user presence data indicates time intervals when a user is present in the locale 120. In some embodiments, receiving 520 the user presence data includes combining energy usage data for a plurality of power outlets 110 located in the locale 120. Receiving 520 the user presence data may also include the history module 320 storing the user presence data as presence history.

The method 500 modifies 525 the power model for the power outlet based on the energy usage data and the user presence data. In one embodiment, the update module 225 modifies 525 the power model 145 for the power outlet 110 based on the energy usage data and the user presence data. In certain embodiments, modifying 525 the power model 145 includes identifying statistically significant periods of high power consumption and statistically significant periods of low power consumption from the energy usage data. Modifying 525 the power model 145 may further include generating a power usage pattern from the statistically significant periods, and customizing the power model 145 using the power usage pattern.

The method 500 selectively provides 530 electrical power to the power outlet according to the power model and the method 500 ends. In one embodiment, the power control module 230 selectively provides 530 electrical power to the power outlet 110 according to the power model 145. Selectively providing 530 electrical power to the power outlet 110 based on the power model 145 includes activating the power outlet 110 at times designated by the power model 145 and/or deactivating the power outlet 110 at times designated by the power model 145.

Figure 6:
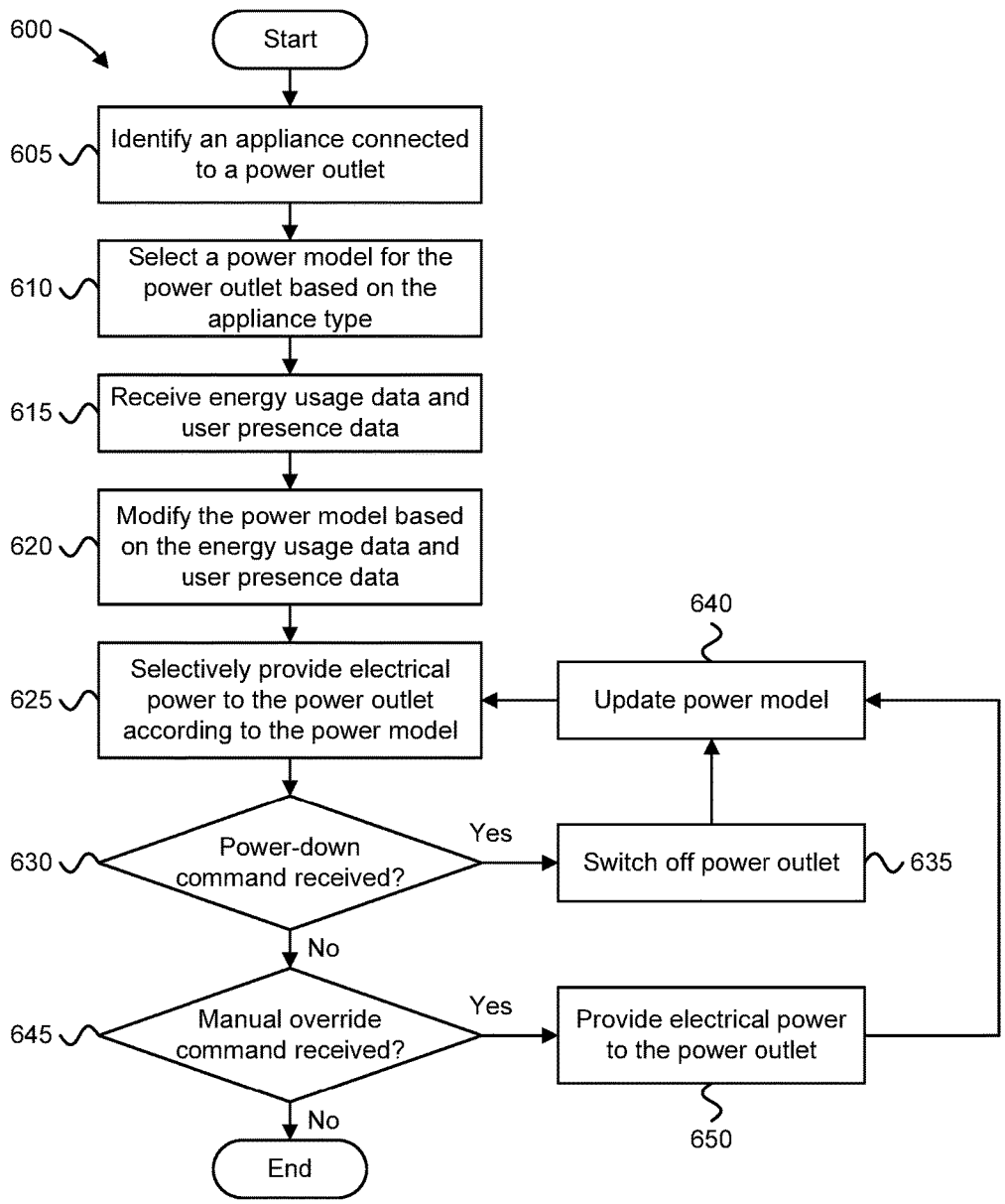
FIG. 6 is a schematic flowchart diagram illustrating one embodiment of a method for analytic-based control of energy consumption in accordance with one embodiment of the present invention.

FIG. 6 depicts a method 600 for analytic-based control of energy consumption, according to embodiments of the present disclosure. The method 600 controls energy consumption at a power outlet 110 by selectively providing electrical power to the power outlet 110 based on a power model. In some embodiments, the method 600 may be performed by the energy management device 105. In addition, the method 600 may be performed by a processor (e.g., the processor 125) and/or other semiconductor hardware embodied in the energy management device 105. In another example, the method 600 may be embodied as computer program code stored on computer readable storage media.

The method 600 begins and identifies 605 an appliance connected to a power outlet. In one embodiment, the identity module 205 identifies 605 the appliance 115 connected to the power outlet 110. In some embodiments, identifying 605 the appliance 115 includes receiving a wireless data packet from the appliance 115 and identifying the appliance 115 based on the wireless data packet. In certain embodiments, identifying 605 the appliance 115 includes identifying an appliance type of the appliance 115.

The method 600 selects 610 a power model for the power outlet based on an appliance type of the appliance. In one embodiment, the selection module 210 selects 610 a power model 145 for the power outlet 110 based on an appliance type of the appliance 115. In certain embodiments, the power model 145 designates times that the power outlet 110 is to be powered and times that the power outlet 110 is to be unpowered.

The method 600 receives 615 energy usage data for the power outlet and user presence data for a locale containing the power outlet. In one embodiment, the usage module 215 receives 615 energy usage data for the power outlet 110 and the presence module 220 receives 615 user presence data for a locale 120 containing the power outlet 110.

The method 600 modifies 620 the power model for the power outlet based on the energy usage data and the user presence data. In one embodiment, the update module 225 modifies 620 the power model 145 for the power outlet 110 based on the energy usage data and the user presence data.

In certain embodiments, modifying 620 the power model 145 includes customizing the power model 145 based on patterns of power usage and/or user presence. In some embodiments, modifying 620 the power model 145 includes changing the times that the power outlet 110 is to be powered and times that the power outlet 110 is to be unpowered based on the energy usage data and/or user presence data.

The method 600 selectively provides 625 electrical power to the power outlet according to the power model 145. In one embodiment, the power control module 230 selectively provides 625 electrical power to the power outlet 110 according to the power model 145. Selectively providing 625 electrical power to the power outlet 110 based on the power model 145 includes activating the power outlet 110 at times designated by the power model 145 and/or deactivating the power outlet 110 at times designated by the power model 145.

The method 600 determines 630 whether a power down command is received, e.g., from the power outlet 110 and/or the appliance 115. In one embodiment, the power down module 305 determines 630 whether a power down command is received from the power outlet 110 and/or the appliance 115.

In response to receiving a power down command, the method 600 proceeds to switch off 635 the power outlet. In one embodiment, the control module 230 temporarily switches off 635 the power outlet 110 in response to the power down module 305 receiving a power down command from the appliance 115. Otherwise, in response to not receiving a power down command from the appliance, the method 600 determines 645 whether a manual override command is received from the power outlet.

Temporarily switching off 635 the power outlet 110 may include the power control module 230 temporarily deactivating the power outlet 110. In some embodiments, the power down command includes a time parameter, wherein the power control module 230 deactivates the power outlet 110 for an amount of time indicated by the time parameter. In certain embodiments, a timer is initiated in response to receiving the power down command, the timer being set for an amount of time indicated by the timer parameter. The timer module 310 may initiate a timer and further signal the power control module 230 when the timer expires.

In response to temporarily switching off 635 the power outlet, the method 600 includes updating 640 the power model. In one embodiment, the update module 225 updates 640 the power model 145 based on the power down command. For example, if a power down command is received at certain time a day for statistically significant number of times, and the update module 225 may modify the power model 145 so that the power outlet 110 is deactivated at the certain time of day. Updating 640 the power model 145 command may include updating usage history and/or presence history based on the power down command and modifying the power model 145 based on the usage history and presence history. In response to updating 640 the power model, the method 600 continues to selectively provide a 625 electrical power to the power outlet according to the power model 145.

In response to not receiving a power down command from the appliance, the method 600 determines 645 whether a manual override command is received from the power outlet. In one embodiment, the override module 315 determines 645 whether a manual override command is received. In some embodiments, receiving the manual override command includes receiving user input via the power outlet 110.

For example, the user may press the manual override switch 113 in response to the user desiring to draw power from the power outlet 110 while the power outlet 110 is in an unpowered state. In other embodiments, receiving the manual override command may include receiving user input from a web browser or other application.

In response to receiving a manual override command, the method 600 proceeds to temporarily override 650 the power model and updates 640 the power model. In one embodiment, the power control module 230 temporarily overrides 650 the power model 145 in response to the override module 315 receiving a manual override command. Otherwise, in response to not receiving a manual override command, the method 600 ends.

Temporarily overwriting 650 the power model 145 may include the override module 315 signaling the power control module 230 to deactivate the power outlet 1104 predetermined amount of time in response to the power outlet 110 being energized when the manual override command is received. Alternatively, temporarily overwriting 650 power model 145 may include the override module 315 signaling the power control module 230 to activate/energize the power outlet 110 for a predetermined amount of time in response to the power outlet 110 being deactivated when the manual override command is received.

In response to providing 650 electrical power to the power outlet, the method 600 includes updating 640 the power model. In one embodiment, the update module 225 updates 640 the power model 145 based on the manual override command. For example, if a manual override command is received at certain time a day for statistically significant number of times, and the update module 225 may modify the power model 145 at the certain time of day. Updating 640 the power model 145 command may include updating usage history and/or presence history based on the manual override command and modifying the power model 145 based on the usage history and presence history. In response to updating 640 the power model, the method 600 continues to selectively provide a 625 electrical power to the power outlet according to the power model.

Figure 7:
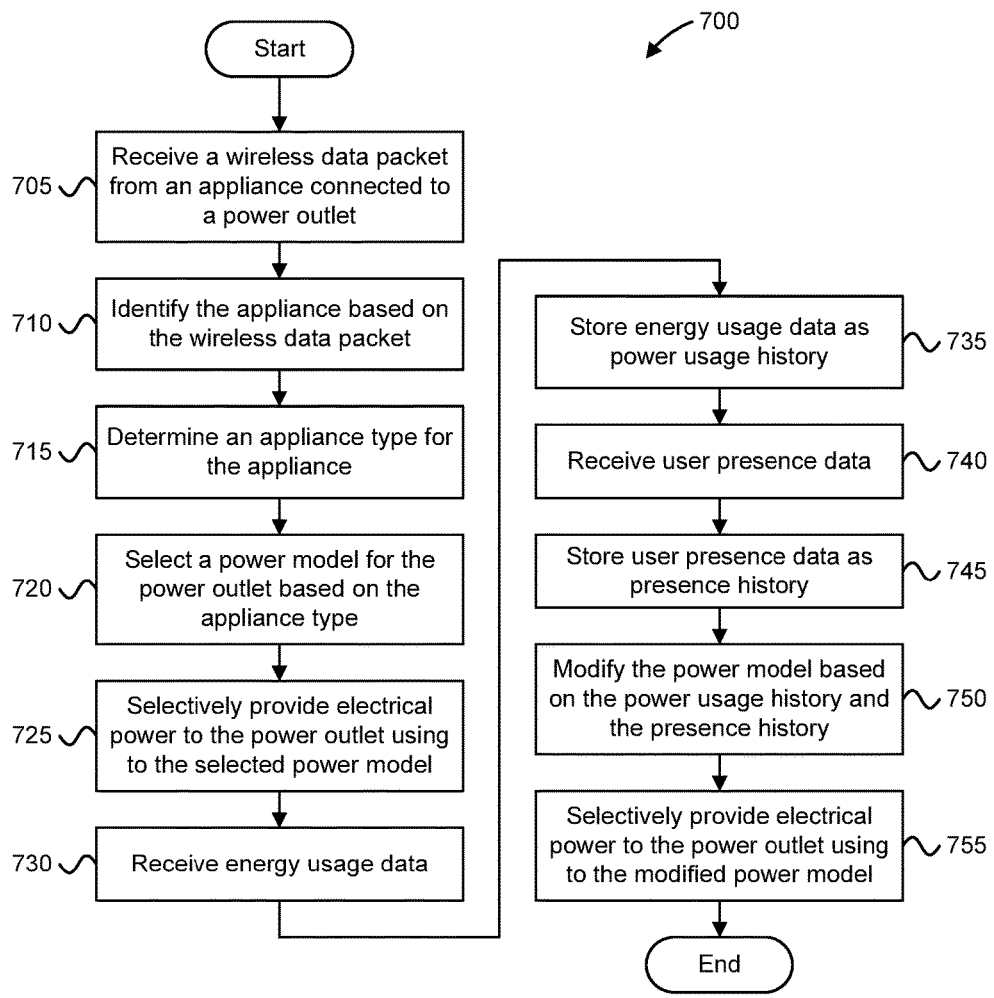
FIG. 7 is a schematic flowchart diagram illustrating one embodiment of a method for analytic-based control of energy consumption in accordance with one embodiment of the present invention.

FIG. 7 depicts a method 700 for analytic-based control of energy consumption, according to embodiments of the present disclosure. The method 700 controls energy consumption at a power outlet 110 by selectively providing electrical power to the power outlet 110 based on a power model. In some embodiments, the method 700 may be performed by the energy management device 105. In addition, the method 700 may be performed by a processor (e.g., the processor 125) and/or other semiconductor hardware embodied in the energy management device 105. In another example, the method 700 may be embodied as computer program code stored on computer readable storage media.

The method 700 begins and receives 705 a wireless data packet from an appliance connected to a power outlet. In one embodiment, the identity module 205 receives 705 a wireless data packet, via the network interface 155, from an appliance 115 connected to the power outlet 110. In some embodiments, receiving 750 the wireless data packet may include the power outlet 110 the appliance 115 transmitting the wireless data packet to the power outlet 110. In other embodiments, receiving 705 the wireless data packet may include the power outlet 110 and/or the identity module 205 intercepting or "sniffing" the wireless data packet to detect the appliance 115.

The method 700 identifies 710 the appliance based on the wireless data packet. In one embodiment, the identity module 205 identifies the appliance 115 based on the wireless data packet. In some embodiments, the wireless data packet includes an appliance identifier, such as an appliance model number, an appliance serial number, and/or an appliance type. In other embodiments, identifying 710 the appliance 115 based on the wireless data packet includes deriving an appliance identifier, such as an appliance model number, an appliance serial number, and/or an appliance type using a network identifier included in the wireless data packet.

The method 700 determines 715 an appliance type for the appliance. In one embodiment, the identity module 205 determines 715 an appliance type for the appliance 115. In some embodiments, an appliance identifier for the appliance 15 includes an appliance type, wherein determining 715 an appliance type includes parsing the appliance identifier to identify the appliance type. In other embodiments, determining 705 the appliance type for the appliance 115 includes using the appliance identifier (e.g., an appliance model number, an appliance serial number, or the like) to determine an appliance type corresponding to the appliance 115.

The method 700 selects 720 a power model for the power outlet based on the appliance type of the appliance. In one embodiment, the selection module 210 selects 720 the power model 145 for the power outlet 110 based on the appliance type of the appliance 115. In certain embodiments, the power model 145 designates times that the power outlet 110 is to be powered and times that the power outlet is to be unpowered.

The method 700 selectively provides 725 electrical power to the power outlet according to the selected power model 145. In one embodiment, the power control module 230 selectively provides 725 electrical power to the power outlet 110 according to the selected power model 145. Selectively providing 725 electrical power to the power outlet 110 based on the selected power model 145 includes activating the power outlet 110 at times designated by the power model 145 and/or deactivating the power outlet 110 at times designated by the selected power model 145.

The method 700 receives 730 energy usage data for the power outlet. In one embodiment, the usage module 215 receives 725 energy usage data for the power outlet 110. The method 700 stores 735 the energy usage data as power usage history. In one embodiment, the history module 320 stores 735 the energy usage data as power usage history. In some embodiments, storing 735 the power usage history includes storing the presence history in the memory 140.

The method 700 receives 740 user presence data for a locale containing the power outlet. In one embodiment, the presence module 220 receives 740 user presence data for a locale 120 containing the power outlet 110. The method 700 stores 745 the user presence data as presence history. In one embodiment, the history module 320 stores 745 the user presence data as presence history. In some embodiments, storing 745 the presence history includes storing the presence history in the memory 140.

The method 700 modifies 750 the power model for the power outlet based on the power usage history and the presence history. In one embodiment, the update module 225 modifies 750 the power model 145 for the power outlet 110 based on the power usage history and the presence history. Modifying 750 the power model 145 may include changing the times that the power outlet 110 is to be powered and changing the times that the power outlet 110 is to be unpowered based on statistically significant periods of power consumption per on the power usage history and based on statistically significant periods of user presence per the presence history.

The method 700 selectively provides 755 electrical power to the power outlet according to the modified power model and the method 700 ends. In one embodiment, the power control module 230 selectively provides 755 electrical power to the power outlet 110 according to the modified power model 145. Selectively providing 755 electrical power to the power outlet 110 based on the modified power model 145 includes activating the power outlet 110 at times designated by the power model 145 and/or deactivating the power outlet 110 at times designated by the power model 145 as modified based on the power usage history and the presence history.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an identity module that receives an appliance identifier for an appliance connected to a power outlet;
   a model selection module that selects a power model for the power outlet based on the appliance identifier, the power model designating times that the power outlet is to be powered and times that the power outlet is to be unpowered;
   a usage module that receives energy usage data for the power outlet;
   a presence module that receives user presence data for a locale containing the power outlet;
   a model update module that modifies a power model for the power outlet based on the energy usage data and the user presence data; and
   a power control module that selectively provides electrical power to the power outlet according to the power model,
   wherein at least a portion of the identity module, model selection module, usage module, presence module, model update module, and power control module comprise one or more of hardware and executable code, the executable code stored on one or more computer readable storage media.

2. The apparatus of claim 1, further comprising a power down module that receives a power down command from the appliance, wherein the power control module withholds electrical power from the power outlet in response to the power down command and the model update module modifies the power model based on the power down command, wherein at least a portion of the power down module comprises one or more of hardware and executable code, the executable code stored on one or more computer readable storage media.

3. The apparatus of claim 2, further comprising a timer module that initiates a timer in response to the power down command, the timer counting an amount of time indicated in a timer parameter of the power down command, wherein the power control module provides power to the power outlet based on the power model in response to expiration of the timer, wherein at least a portion of the timer module comprises one or more of hardware and executable code, the executable code stored on one or more computer readable storage media.

4. The apparatus of claim 2, wherein the power down module receives the power down command from the appliance via a wireless interface.

5. The apparatus of claim 1, further comprising an override module that:
receives a manual override command for the power outlet; and
signals the power control module to override the power model in response to the manual override command, wherein the model update module modifies the power model based on the manual override command,
wherein at least a portion of the override module comprises one or more of hardware and executable code, the executable code stored on one or more computer readable storage media.

6. The apparatus of claim 1, wherein the presence module further receives locale information for the locale, wherein the model selection module selects the power model based on the locale information.

7. The apparatus of claim 1, further comprising a history module that:
tracks the energy usage data as power usage history; and
tracks the user presence data as presence history, wherein the model update module modifies the power model based on a statistical analysis of the power usage history and the presence history,
wherein at least a portion of the history module comprises one or more of hardware and executable code, the executable code stored on one or more computer readable storage media.

8. The apparatus of claim 7, further comprising a pattern module that
identifies one or more periods of statistically significant low power usage from the power usage history;
identifies one or more periods of statistically significant high power usage from the power usage history; and
generates a power usage pattern for the appliance based on the periods of low power usage and periods of high power usage, wherein the model update module modifies the power model based on the power usage pattern for the appliance,
wherein at least a portion of the pattern module comprises one or more of hardware and executable code, the executable code stored on one or more computer readable storage media.

9. The apparatus of claim 1, wherein the presence module further identifies times a user is present in the locale and times a user is likely to use the appliance, wherein the model update module modifies the power model based on the identified times.

10. A method for analytic-based control of energy consumption comprising:
identifying, by an energy management device, an appliance connected to a power outlet;
selecting, by the energy management device, a power model for the power outlet based on the appliance identity, the power model designating times that the power outlet is to be powered and times that the power outlet is to be unpowered;
receiving, at the energy management device, energy usage data for the power outlet;
receiving, at the energy management device, user presence data for a locale containing the power outlet;
modifying, by the energy management device, the power model for the power outlet based on the energy usage data and the user presence data; and
selectively providing electrical power to the power outlet by the energy management device according to the power model.

11. The method of claim 10, further comprising:
receiving a power down command from the appliance;
switching off the power outlet in response to the power down command; and
updating the power model based on the power down command.

12. The method of claim 11, wherein the power down command includes a timer parameter, the method further comprising:
setting a timer based on the timer parameter; and
selectively providing power to the power outlet according to the power model in response to expiration of the timer.

13. The method of claim 10, further comprising:
receiving a manual override signal from the power outlet;
overriding the power model in response to the manual override signal; and
updating the power model based on the manual override signal.

14. The method of claim 10, wherein identifying the appliance comprises determining an appliance type for the appliance, and wherein selecting a power model for the power outlet based on the appliance identity comprises selecting the power model based on the appliance type.

15. The method of claim 10, further comprising:
storing the received energy usage data as power usage history; and
storing the received user presence data as presence history, wherein modifying the power model includes updating the power model based on a statistical analysis of the power usage history and the presence history.

16. The method of claim 10, wherein identifying the appliance connected to a power outlet comprises:
receiving a wireless data packet from the appliance; and
identifying the appliance based on the wireless data packet.

17. A computer program product for analytic-based control of energy consumption, the computer program product comprising a computer readable storage medium having program instructions embodied therewith, the program instructions readable/executable by a processor to cause the processor to:
receive, by processor, an appliance type parameter for an appliance connected to a power outlet;
select, by processor, a power model for the power outlet based on the appliance type parameter, the power model designating times that the power outlet is to be powered and times that the power outlet is to be unpowered;
selectively provide, by processor, electrical power to the power outlet according to the power model;
collect, by processor, energy usage data for the power outlet;
collect, by processor, user presence data for a locale containing the power outlet; and
modify, by processor, the power model for the power outlet based on the energy usage data and the user presence data.

18. The computer program product of claim 17, the program instructions further causing the processor to store, by processor, the energy usage data as power usage history and store the user presence data as presence history, wherein the modifying the power model based on the energy usage data and on the user presence data comprises modifying the power model based on a statistical analysis of the power usage history and the presence history.

19. The computer program product of claim 17, the program instructions further causing the processor to:

receive, by processor, a manual override signal from the power outlet;

override, by the processor, the power model in response to the manual override signal; and update, by processor, the power model based on the manual override signal.

20. The computer program product of claim 17, wherein overriding the power model in response to the manual override signal comprises:

determining, by processor, whether the power outlet is energized;

disconnecting the power outlet from a power source in response to determining that the power outlet is energized; and energizing the power outlet in response to determining that the power outlet is not energized.

* * * * *